United States Patent
Vierheilig et al.

(10) Patent No.: US 7,748,284 B2
(45) Date of Patent: Jul. 6, 2010

(54) LUBRICATING ELEMENT AND LUBRICATING UNIT

(75) Inventors: Gerald Vierheilig, Wuerzburg (DE);
Rudolf Schlereth, Burkardroth (DE);
Andre Ziegler, Stadtlauringen (DE);
Michael Klein, Grafenrheinfeld (DE)

(73) Assignee: Robert Bosch GmbH, Stuttgart (DE)

( * ) Notice: Subject to any disclaimer, the term of this patent is extended or adjusted under 35 U.S.C. 154(b) by 97 days.

(21) Appl. No.: 11/781,427

(22) Filed: Jul. 23, 2007

(65) Prior Publication Data

US 2008/0019621 A1  Jan. 24, 2008

(30) Foreign Application Priority Data

Jul. 21, 2006  (DE) ........................ 10 2006 033 850

(51) Int. Cl.
*F16H 25/22* (2006.01)
*F16H 25/24* (2006.01)

(52) U.S. Cl. ..................... 74/89.44; 74/89.4
(58) Field of Classification Search ............... 74/89.4, 74/89.44; 184/102
See application file for complete search history.

(56) References Cited

U.S. PATENT DOCUMENTS

| 549,413 | A | 2/1996 | Tsukada | |
|---|---|---|---|---|
| 6,595,327 | B2 * | 7/2003 | Keller | 184/5 |
| 2001/0010176 | A1 * | 8/2001 | Tsukada et al. | 74/89.44 |

FOREIGN PATENT DOCUMENTS

| EP | 0 874 172 | 10/2000 |
|---|---|---|
| JP | 5-71443 | 9/1993 |

* cited by examiner

*Primary Examiner*—Thomas R Hannon
*Assistant Examiner*—Terence Boes
(74) *Attorney, Agent, or Firm*—Michael J. Striker

(57) ABSTRACT

A lubricating element for rolling element tracks, particularly linear motion systems, has a body composed of a lubricant-storing material, which includes an application section capable of being brought in contact with a rolling element bearing surface to supply lubricant; the body has an elongated shape in a first storage region adjacent to the application section, and a lubricant flow through the first storage region triggered via the dispensing of lubricant at the application section is essentially oriented in the longitudinal direction of the first storage region.

24 Claims, 6 Drawing Sheets

LUBRICATING ELEMENT AND LUBRICATING UNIT

CROSS-REFERENCE TO A RELATED APPLICATION

The invention described and claimed hereinbelow is also described in German Patent Application DE 10 2006 033 850.2, filed on Jul. 21, 2006. This German Patent Application, whose subject matter is incorporated here by reference, provides the basis for a claim of priority of invention under 35, U.S.C. 119(a)-(d).

BACKGROUND OF THE INVENTION

The present invention relates to a lubricating element for rolling element tracks, particularly linear systems, with a body made of a lubricant-storing material, which includes an application section capable of being brought in contact with a rolling element bearing surface to supply lubricant.

Linear systems in the sense of the present application are rolling element screw drives (e.g., ball spindle drives), rolling element ring bushings (e.g., ball ring bushings), and rolling element-supported profiled rail guides, which are often also referred to as linear guides. An aspect shared by all of these linear systems is that a nut element or carriage element is supported such that it is movable along a linear guide element, and a longitudinal displacement of the nut element or carriage element takes place by rolling elements (balls or rollers) rolling between tracks formed on the nut element or carriage element and the guide element. The rolling bodies move along a closed path in a rolling element circuit with a load channel formed between facing bearing surfaces on the linear guide element and on the nut element or carriage element, and a return channel that connects the two ends of the load channel and is typically guided by the nut element or carriage element.

To ensure that the rolling of the rolling elements is satisfactory, the tracks of linear systems of this type must be lubricated with a lubricant (typically a lubricating oil), mainly in the region of the load channel. To enable compensation of lubricant losses that unavoidably occur during operation of a system of this type, it is desired that lubricant be supplied continually during the entire operating period, the lubricant supply ideally remaining consistent for the entire duration of operation and being chosen such that its level exactly compensates the lubricant losses.

Publication U.S. Pat. No. 5,492,413, discloses a sealing plate for a carriage of a profiled rail guide that is supported such that it is movable along a guide rail. The sealing plate is mounted on both axial ends of the carriage and is bonded with a layer made of a lubricant-saturated, foamed material, which performs the lubricating function. The inner edge of this foamed material layer forms a lubricant delivery lip resting on the guide rail, which is supplied with lubricant from the surrounding regions of the foamed material layer.

Publication EP 0, B74 172, B2, also discloses a sealing plate for a profiled rail guide with an integrated lubricating device, which is installed on the axial ends of a carriage. With this multi-component lubricating device, an element, e.g., a perforated plate, which limits the flow path of the lubricant from the first layer to the second layer, is located between a first, lubricant-storing layer, which is not in contact with the guide rail, and a second, lubricant-supplying layer, the inner edge of which bears against the guide rail. As a result, the rate at which lubricant is supplied is limited in a manner such that it remains as stable as possible, independently of the stored quantity of lubricant, which decreases the longer the linear guide operates.

A further system—designed as a single piece—for lubricating rolling element tracks of a profiled rail guide is made known in JP 5-71143, U. With this system, lubricant-saturated foamed material inserts are inserted in a receiving space of a sealing unit installed on the axial ends of the carriage. The insides of the foamed material inserts are in contact with the rolling element bearing surfaces of the guide rail.

SUMMARY OF THE INVENTION

The object of the present invention is to provide a lubricating element for rolling element tracks, which has the simplest design possible and makes it possible to adjust the lubricant supply rate in a satisfactory manner, even over longer periods of time.

This object is attained according to the present invention in that, in the case of a lubricating element for rolling element tracks, particularly linear systems, with a body composed of a lubricant-storing material, which includes an application section capable of being brought in contact with a rolling body bearing surface to supply lubricant, the body has an elongated shape in a first storage region adjacent to the application section, and a lubricant flow through the first storage region triggered via the dispensing of lubricant at the application section is essentially oriented in the longitudinal direction of the first storage region.

A "lubricant-storing material" is understood to mean a material that can be saturated with a lubricant (i.e., a liquid with suitable viscosity) and that is capable of storing a certain quantity of this lubricant. When the term "effective porosity" is used to describe the portion of the volume formed by cavities or pores in a material of a specified total volume of the material, this means that a lubricant-storing material has an effective porosity greater than zero. The effective porosity can be a constant, but it is often the case that the effective porosity depends on the quantity of a stored lubricant, because the pores can expand as the quantity of stored lubricant increases.

The "elongated shape of the body"—according to the present invention—in the first storage region means that a preferred direction exists in the first storage region, i.e., its longitudinal direction, in which the total extension of the first storage region is clearly greater than in all directions orthogonal to the preferred direction. With elongated bodies of this type, the square root of the cross-sectional area measured orthogonally to the preferred direction is therefore clearly smaller than the total extension of the body in the preferred direction. Expressed graphically, it could therefore be said that, in the first storage region, the body has a cord-like shape or, specifically with regard for its ability to be saturated with lubricant—a wick-like shape.

In the state in which the lubricating element is installed in the linear system for operation, an application section—located on the body—of the lubricating element bears against a rolling body bearing surface, so that, when there is relative motion between the nut element or carriage element and the guide element, the application section glides along the rolling element bearing surface and supplies a certain quantity of lubricant to the rolling element bearing surface while this gliding motion takes place. When the lubricating element is assigned, e.g., to the carriage element or the nut element, the application section glides along the rolling element bearing surface formed on the guide element. The quantity of lubricant dispensed is replenished from the first storage region adjacent to the application section. During operation, this results in a lubricant flow through the first storage region toward the application section. This lubricant flow is essentially driven by a concentration gradient of stored lubricant that arises from the application section through the first storage region. In addition, depending on the installation position, further effects can also play a role, e.g., shear force effects when the device is installed in a nearly vertical position.

If one assumes that, when a lubricating element is used in a linear system, the first storage region is saturated essentially evenly with lubricant, then the first storage region becomes increasingly depleted of lubricant as operation continues, and this depletion progresses from the regions adjacent to the application section outwardly in the longitudinal direction of the first storage region. Associated therewith is an evenly declining rate of supply of lubricant at the application section, which is due to the fact that the concentration gradient of lubricant that arises in the first storage region becomes increasingly flat as the first storage region continues to empty. A basic aim 1s to attain a rate of lubricant supply that is as constant over time as possible, so this decrease in the rate of lubricant supply is basically undesired. It has been shown, however, that with a lubricating element of the type according to the present invention, the decline in the rate of lubricant supply can be adjusted and controlled relatively well in a first storage region with an elongated shape. This makes it possible to remain within a range between a maximum desired rate of lubricant supply (when the first storage region is saturated evenly) and a minimum desired rate of lubricant supply (when the first storage region has been emptied nearly entirely), for any application. By choosing a cross-sectional area of the body in the first storage region that is sufficiently large, it is also possible to keep the difference between the maximum rate of lubricant supply and the minimum rate of lubricant supply within reasonable limits, even over longer operating periods.

Typically, a single first storage region adjacent to the application section is sufficient. Designs for the lubricating element are also feasible, however, with which several first storage regions abut the application section and extend outwardly from there in the form of several "cords" or "wicks".

The application section can be located in an end-face end region of the first storage region. During operation of the linear motion system, a lubricant flow through the first storage region oriented essentially in one direction therefore results, the lubricant flow being oriented toward the end-face end region, and the starting point of which is continually displaced toward the diametrically opposed, end-face end regions of the first storage region.

The body can be formed, e.g., of an open-cell foamed material. Ester-based PUR foamed materials have proven to be a suitable foamed material, for example. Foamed materials of this type can be foamed and then pressed to form panels having a desired pore size. Panels have proven suitable, e.g., with a relative density after pressing of between 60, and 250, kg/m$^3$, particularly approximately 200, kg/m$^3$. Foamed materials of this type are available under the trade names Inducon, Normont, and Cellofoam. In the past, it has been shown that these foamed materials are suitable in terms of their wear resistance and chemical resistance, and in terms of their lubricant absorption capacity.

The body can be cut out of a foamed material panel, e.g., using water-jet cutting, and is relatively easy to manufacture in this manner.

It is not required to use a separate application section. Instead, the application section can be formed as a single piece with the first storage region, which is favorable in terms of manufacturing. For example, the body can include at least one indentation in the first storage region. The application section is formed between the indentation and one or more lateral surfaces of the body, or the body can include several indentations in the first storage region. The application section is formed between the indentations and, possibly, lateral surfaces of the body. Roughly speaking, it could be said that a cut-out end of the first storage region forms the application section. The size, i.e., the cross section in particular, of the application section can thereby be adapted to the particular rolling element bearing surface.

In addition, the region between the indentation and the lateral surface, or the region between indentations, which is provided to form the application section, is capable of being folded over, thereby forming a right angle with the adjacent surface of the body. The application section is then positioned transversely to the longitudinal direction of the first storage region, at least in the installed state of the lubricating element. The angle between the direction of extension of the application section and the longitudinal direction of the first storage region is preferably essentially 90°. This method of creating the application section requires that the material of which the body is composed have a certain formability and/or elasticity. Since this material must still have porosity, so it is capable of storing lubricant (a foamed material is typically used), it can be assumed that practically any feasible material will allow the region provided for the application section to be folded over. To name an example of this design of the application section, the body can include—on an end face in the first storage region—at least one slot, which extends essentially in the longitudinal direction of the first storage region, and one of the two subregions produced as a result can be folded over on the end face, so that this subregion projects laterally, and its longitudinal direction extends at a right angle, e.g., essentially orthogonally, to the longitudinal direction of the upper storage region.

The cross section of the application section can be smaller than the cross section of the body in the first storage region. The "cross section of the application section" basically refers to the size of the surface of the applicator, which includes the regions of the applicator in contact with the track or at least with the bearing surfaces of the rolling elements formed in the track. This cross section is typically chosen depending on the dimensions of the particular track, i.e., ultimately the dimensions of the rolling elements, such that the application section can bear essentially at least against the actual rolling element bearing surfaces. When balls are used as the rolling elements, for example, the rolling element tracks can have a gothic track profile, with two diametrically opposed ball surfaces forming the ball bearing surfaces. When the application section is rectangular in design, so that its corners bear against the ball bearing raceways of the gothic track profile, the corners are pressed together elastically, so that they bear against the bearing surfaces over a broader width. The applicator need not bear against the base of the track, however. In practical applications, embodiments have proven effective with which the cross section of the applicator is only half as large or one-fourth as large as the cross section of the body in the first storage region.

The cross section of the applicator has negligible influence on the rate of lubricant supply, since the length of the applicator is negligibly small compared with the length in the longitudinal direction of the first storage region. As a result, a concentration gradient that is sufficiently great is always formed across the application section.

For example, the body in the first storage region can have a rectangular cross section. In this case, it can be cut out of a panel-type material particularly easily. Other cross sections, particularly round or oval cross sections, are also feasible, of course.

To accommodate a first storage region with a long length in the longitudinal direction in the most compact space possible, it can be provided that the body in the first storage region is wound into the shape of a spiral or a ring. This system is particularly favorable when the linear system includes a cylindrical guide element, e.g., a spindle of a rolling element screw drive or a cylinder guide of a ring bushing. In the case of a rolling element screw drive, the spiral wound storage region can be wound around the guide element. An application section bent at a right angle relative to the longitudinal direction (=circumferential direction of the spiral turns) of the first storage region is in contact with the outer surface of the guide element in which the rolling element tracks are formed.

With a lubricating element with a body spiral-wound in the first storage region, to prevent lubricant from being transported between spiral turns and transversely to the winding direction, it can be provided that the individual spiral turns have clearance between each other. Lubricant can therefore only be transported longitudinally to the winding direction of the spiral turns. As an alternative or in addition thereto, it can be provided that a lubricant-impermeable intermediate layer, e.g., composed of plastic, is located between individual spiral turns. Any type of essentially lubricant-impermeable plastic material can be chosen for the intermediate layer. For example, rubber rings inserted between the individual spiral turns have proven to be suitable.

In a suitable embodiment, the body in the first storage region can be enclosed by a jacket composed essentially of lubricant-impermeable material, e.g., plastic, and the body-jacket combination is wound in the shape of a spiral or a ring. Even when the individual spiral turns bear against each other, the jacket prevents lubricant from being transported between the individual turns, thereby enabling lubricant in the first storage region to be transported essentially only in the longitudinal direction of the first storage region, i.e., in the direction of the turns. The jacket can be a tube, for example, that is pulled over the body in the first storage region, after it is cut out of a panel-type material. As an alternative, it can be provided that the body in the first storage region is wrapped with a strip of composed essentially of lubricant-impermeable material, e.g., plastic, and the body-jacket combination is wound in the shape of a spiral or a ring. With this variant, the often difficult step of sliding a tube composed of lubricant-impermeable material over the body in the first storage region can be eliminated. The same lubricant seal can be attained, instead, by wrapping the body with the strip, preferably in a spiral manner, with the individual layers of the strip overlapping partially.

One of the simplest methods for ensuring that lubricant is not transported transversely to the winding direction of the spiral turns with a spiral-wound first storage region with individual spiral turns bearing against each other is to cut the body out of a panel of open-cell foamed material; the top and underside of the panel is closed-cell in design, and the body in the first storage region is wound such that the closed-cell lateral surfaces touch each other. The closed-cell lateral surfaces form a largely impenetrable barrier for the lubricant, so that lubricant is also transported here essentially in the longitudinal direction of the first storage region (i.e., in the winding direction of the spiral turns).

If desired, the embodiments of the lubricating element body described above can be used for the entire body rather than only in the first storage region.

It is favorable when the body includes a second storage region adjacent to the elongated, first storage region. The second storage region does not need to have an elongated shape similar to that of the first storage region. Instead, the cross section of the second storage region—as measured orthogonally to the longitudinal direction of the first storage region—can be larger, by any extent, than the corresponding cross section of the first storage region. Provided the application section is located on one of the end faces of the first storage region, it is possible, e.g., that the second storage region abuts the end face of the first storage region diametrically opposed to the application section. The function of the second storage region is as follows:

When a linear system is operated, lubricant is transported primarily from the first storage region toward the application section. As a result, the first storage region becomes increasingly depleted of lubricant as operation continues. After a sufficiently long period of operation, this would result in the first storage region become fully depleted of lubricant. In this situation, the lubricating element would have to be replaced or resaturated with lubricant. When a second storage region abuts the first storage region, however, which has a preferably considerably greater volume available for storing lubricant than does the first storage region, shutdown periods in which the linear system is at a standstill for a relatively long period of time can be used to automatically refill the lubricant supply stored in the first storage region. Provided that the lubricant concentration in the second storage region is greater than in the first storage region—which would typically be the case after a certain period of operation, because only the quantity of lubricant stored in the first storage region has decreased—when the carriage or the nut of the linear system is at a standstill, lubricant flows from the first storage region into the second storage region, thereby refilling the first storage region.

When the linear system is started up once more, the rate of lubricant supply via the application section is therefore clearly higher than it was at the end of the most recent shutdown period. In fact, it approaches the new state when the shutdown period is sufficiently long. Even very brief shutdown periods can be utilized in this manner as standstill phases of the carriage and the nut.

The first storage region therefore performs the function of an intermediate storage element, which is refilled during shutdown periods with lubricant supplied from the second storage region. As a result, the rate of lubricant supply can always be held between a predetermined maximum value when the first storage region is completely full and a minimum value—which is close to the predetermined maximum value—when the first storage region has been nearly entirely depleted of lubricant, and this for the entire service life of a linear system in this manner, lifetime lubrication of linear systems can be realized in a very simple manner.

The first and second storage regions can be designed as single pieces, e.g., they can be cut from the same panel of foamed material.

With linear systems with a cylindrical guide element, e.g., rolling element screw drives or ring bushings, it is favorable when the second storage region is annular in design, thereby enabling the spindle or guide cylinder to be passed through it. The annular shape can be realized very easily by bending or winding a suitably cut-out foamed material panel, and it results in a compact design of the lubricating element and a lubricating unit which includes the lubricating element.

Preferably, it is provided that the inventive lubricating element is integrated in a lubricating unit for tracks of rolling elements of a linear system, particularly in a rolling element screw drive or a ball screw drive, of a profiled rail guide or a ring bushing. The linear system includes a nut element or carriage element that is movably guided via rolling elements along a linear guide element. The lubricating unit is installed on an axial end of the nut element or carriage element. With a nut element or carriage element provided with a lubricating unit on both axial ends, lubrication of the rolling element tracks can take place even in the load channel in any direction of motion before the rolling elements guided in their endless circuit come in contact with the bearing surface. This results in extremely efficient lubrication that requires a very small amount of lubricant.

The inventive lubricating element is suited most particularly for use in cases in which the linear system is a rolling element screw drive, particularly a ball screw drive, including a spindle as the guide element, and a nut element enclosing the spindle, as the movable element; at least one nut groove with two end regions—the nut groove extending around the axis in the manner of a helix and guiding rolling elements—is formed in the inner circumferential surface of the nut element, the nut groove definining—together with the outer circumferential surface of the spindle—a helical rolling element screw path extending between the two end regions; the rolling element screw path is appended by a rolling element return path extending between the two end regions to form a closed rolling element recirculating path, which is filled with an endless row of rolling elements—ready to roll at all times—lying in the nut groove and on a helical trajectory of the outer circumferential surface; a rolling element deflection for transferring the rolling elements between the rolling element screw path and the rolling element return path or between the rolling element return path and the rolling element screw path is located on the nut element in each of the end regions.

In this case, it is favorable when the lubricating unit is mountable on the nut element such that any rotary position between the lubricating unit and the nut element can be set, preferably steplessly. This makes it possible to adjust the axial position of the application section to a certain thread pitch by rotating the lubricating unit and the nut element relative to each other accordingly. With the lubricating unit, an annular receiving space for the lubricating element can be formed, e.g., in a cylindrical lubricating element housing, in fact, such that an inner wall of the lubricating element housing encloses the linear guide element, e.g., the spindle of a rolling body screw drive or the cylinder guide of a ring bushing. An opening can be formed in the inner wall of the receiving wall, through which the application section of the lubricating element is guided in order to contact the rolling body bearing surface. With a rolling element screw drive, e.g., the application section guided through the opening comes in contact with a spiral running groove for the rolling elements formed in the outer surface of the spindle.

To attain the greatest flexibility possible with a rolling element screw drive in particular, it can also be provided that an application nose is insertable in the inner wall of the lubricating element housing, in which the opening for the application section is formed. This application nose can be slidable into the inner wall, e.g., in the axial direction. By providing various positionings of the axial position of the opening for various application noses, the same lubricating element housing can be used for different thread pitches on the spindle. It is also possible to attain a correct orientation of the application nose or the application section relative to the thread turns even when the application nose or the application section is fixed in position in the radial direction when the lubricating unit is mounted on the nut element or bush element such that it can be adjusted in various rotary positions relative to the nut element or such element. When holes with different-sized cross sections are also provided in the application nose, the same lubricating unit—its housing, in particular—can also be used for several ball diameters. This results in an extraordinarily great deal of flexibility.

Finally, it can be provided that the receiving space is closed by a cover. The cover can also perform further functions, e.g., it can seal off the carriage or protect the nut from contamination, in particular. It is also feasible that the application nose is not fixed in position rigidly by the cover, but rather with a small amount of play in the axial direction, thereby allowing the opening to adjust automatically relative to the thread pitch.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
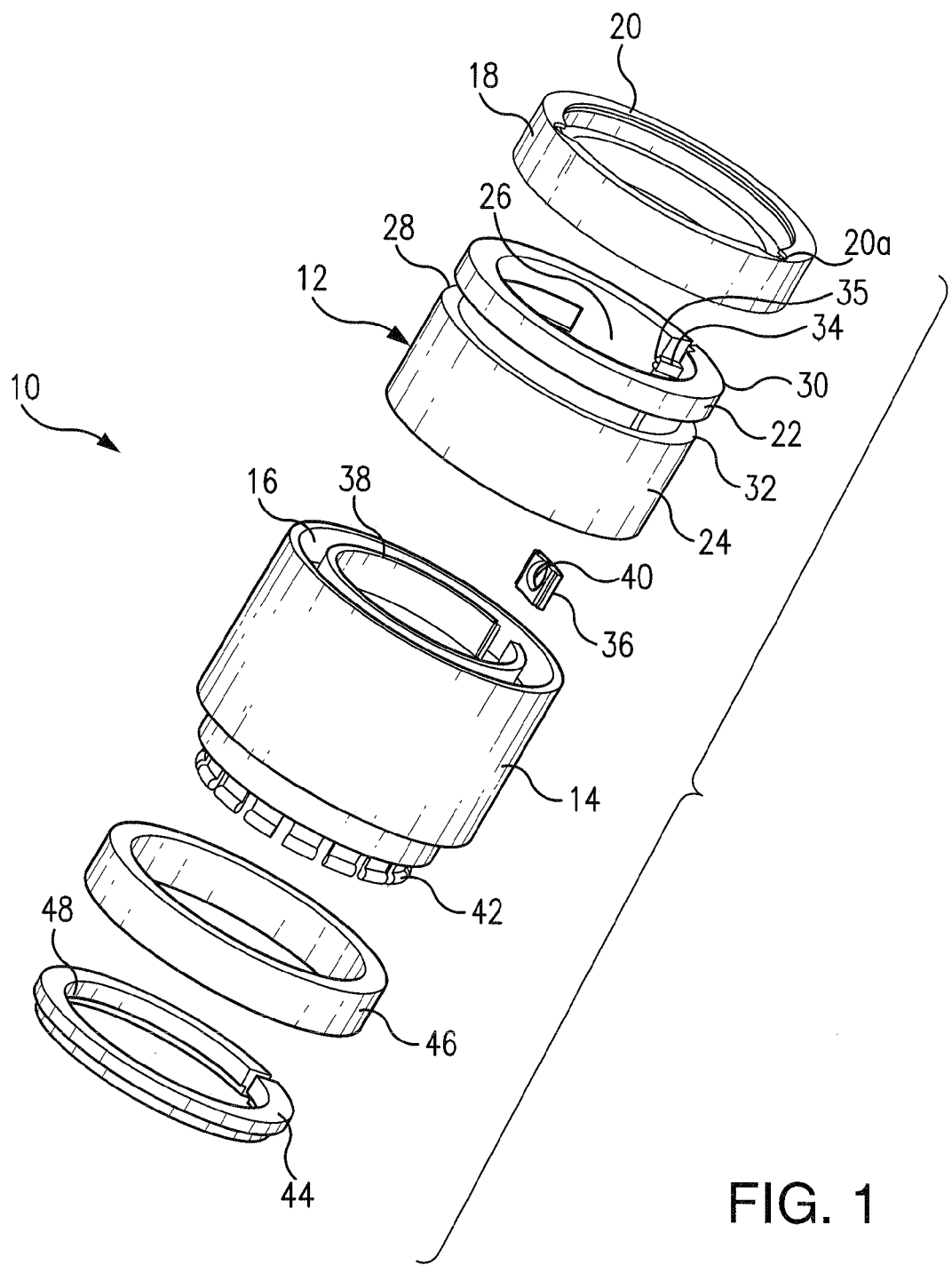
FIG. 1 shows a perspective exploded view of a first embodiment of an inventive lubricating unit with the inventive lubricating element, which is designed to be installed on the axial end of a nut element of a rolling element screw drive.

FIG. 1 shows a perspective exploded view of a lubricating unit for a rolling element screw drive; it is labeled in general with numeral 10 and includes an inventive lubricating element 12. Lubricating unit 10 is designed to be installed on the axial end of a nut of the rolling element screw drive. Lubricating unit 10 includes a main body 14, in which an annular receiving space 16 is formed. Lubricating element 12 is inserted into receiving space 16. Receiving space 16 is closed with a cover 18, which is set in place after lubricating element 12 is installed on main body 14. A seal is also located in cover 18, which bears against the upper surface of the spindle of the rolling element screw drive and ensures that no foreign subjects enter the intermediate space between the nut element and the spindle surface. The seal therefore serves to hermetically seal the rolling element running channel formed between the nut element and the spindle. Projecting edge 20 formed on the front side of cover 18 includes several recesses 20a, into which an assigned projection of the seal (not shown in FIG. 1) can engage. This allows the seal to be fixed in place relative to the cover and prevented from rotating in the circumferential direction. To adapt to different thread pitches, one of the recesses 20a, in which the seal is inserted is assigned to a predetermined thread pitch, thereby ensuring that the seal can engage with the helical running element bearing surface.

Lubricating element 12 shown in FIG. 1 is designed essentially annular in shape overall, with a first storage region 22, which extends in an annular manner and has the shape of a strand with a relatively small cross section, and with a second storage region 24, which also extends in an annular manner in wide regions and is located concentrically with first storage region 22. Second storage region 24 adjoins first storage region 22 as a single piece in a transition section 26 located between first storage region 22 and second storage region 24 in the axial direction. First storage region 22 and second storage region 24 are separated from each other by an annular gap 28 located outside of transition section 26.

The annular contour of first storage region 22 and second storage region 24 is not entirely closed, but rather has an essentially axially-extending opening gap 30, 32.

An application section 34 projecting toward the inside of the ring abuts the free end of first storage region 22. Application section 34 is cut as a single piece out of the material forming first storage region 22 and is folded over toward the ring axis. In the state of being installed for operation, free end 35 of application section 34 bears against the rolling element track designed in the shape of a spiral in the outer surface of the spindle. Lubricating element 12 is then saturated with lubricant, which is gradually dispensed onto the rolling element track via application section 34.

Lubricating unit 10 includes a separate application nose 36, which is insertable in the axial direction into inner circumferential wall 38 of lubricating element main body 14. An opening 40 is formed in application nose 36, through which—when lubricating element 12 is installed—application section 34 projecting inwardly from first storage region 22 is guided, so that its free end 36 bears against the rolling element track.

Various lubricating elements 12 can be inserted in receiving space 16, provided they have its essentially annular shape with the outer diameter and inner diameter in the region between the outer surface and inner surface of annular receiving area 16. Lubricating element inserts 12 are saturated with a lubricant, e.g., oil, before or immediately after they are inserted into receiving space 12.

On its front end bearing against the nut of the rolling element screw drive, main body 14 includes latch hooks 42 that extend in the axial direction and are distributed concentrically around its inner surface. In the embodiment shown, lubricating unit 10 is mounted on the nut of the rolling element screw drive using latch hooks 42, a clamping ring 44 designed as a segmented split washer, and a lock nut 46. To this end, latch hooks 42 are brought in engagement with a circumferential groove (56, see FIG. 3) formed in the inner surface of the nut of the rolling element screw drive. Circumferential groove 56 normally serves to accommodate the seal designed to protect the nut against penetration by foreign substances from the outside, the seal now being located in cover 18 when lubricating unit 10 is installed. To ensure better retention of lubricating unit 10 in circumferential groove 56, latch hooks 42 do not engage in circumferential groove 56 directly, but rather via auxiliary clamping ring 44. Clamping ring 44 includes a projection 48 extending in the circumferential direction on its inner circumferential edge, which extends much further inward than the very shallow depth of annular groove 56. This makes it possible to use larger latch hooks 42, with correspondingly greater stability. Lock nut 46 serves to ultimately fix lubricating unit 10 in position axially on the nut. Lock nut 46 engages in a thread cut into the outer circumference of main body 14 of lubricating unit 10 and, after latch hooks 42 engage with projection 48, lock nut 46 is tightened and brought to bear against a front side of the nut.

To illustrate the interrelationships described above, FIG. 2 shows lubricating unit 10 in FIG. 1 in the assembled state, but still as a separate component and not installed on the nut of a ball screw drive.

Figure 3:
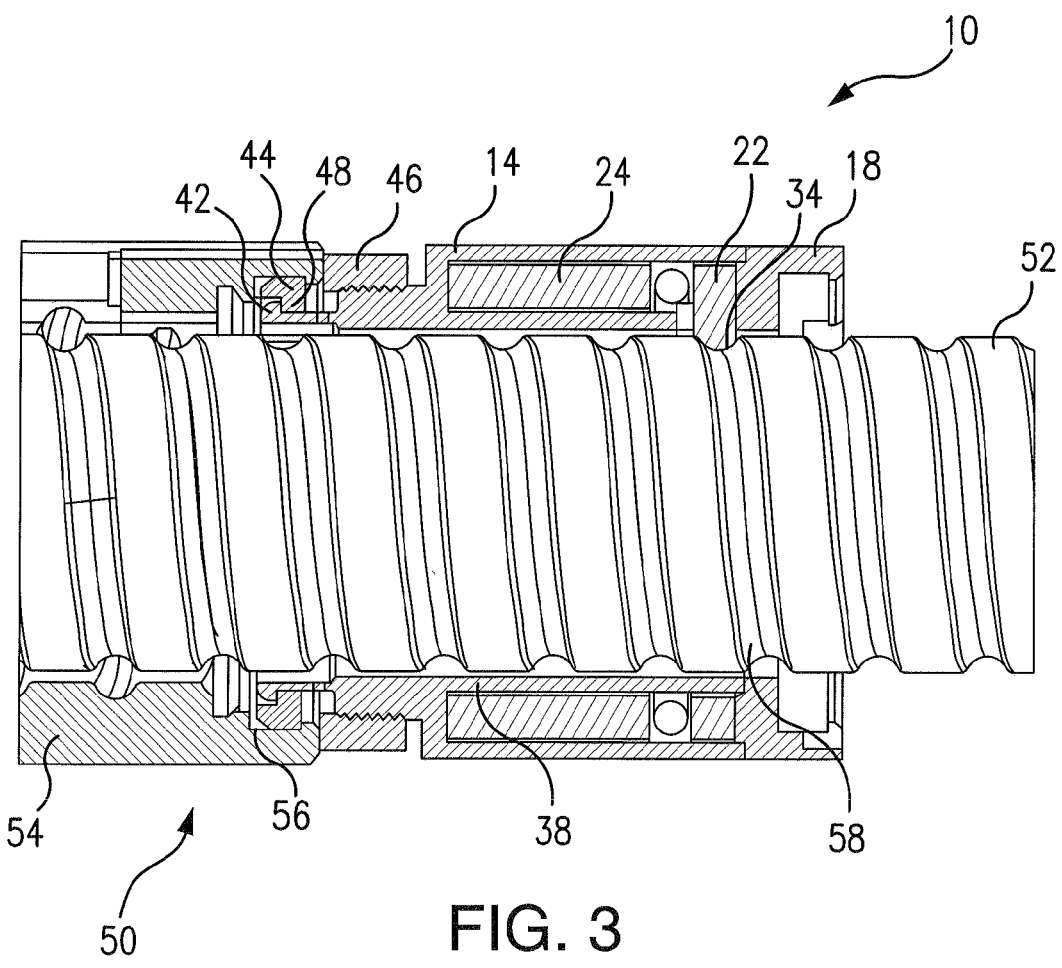
FIG. 3 shows a cross-sectional view through the lubricating unit shown in FIGS. 1 and 2 in a state in which it is installed on the axial end of a nut element of a ball screw drive.

The cross-sectional view in FIG. 3 shows how lubricating unit 10 is installed on nut body 54 of a ball screw drive composed of a nut 50 and a spindle 52. Auxiliary clamping ring 44 is inserted in circumferential groove 56 formed in the inner surface of nut body 54 and bears tightly against its base under the effect of its preload. Latch hooks 42 also bear against projection 48 of the clamping ring—which projects radially inwardly and extends in the circumferential direction—and secures lubricating unit 10 from moving in the axial direction away from nut main body 54. The distance between the inner—in the radial direction—surface of latch hooks 42 and the outer—in the radial direction—surface of spindle 52 is chosen to be so small that the latch hooks cannot become disengaged from projecting section 48 of auxiliary clamping ring 44 when spindle 52 is inserted. The nut unit composed of nut 50 and lubricating unit 10 must therefore be removed from spindle 52 before lubricating unit 10 can be removed. Since latch hooks 42—when engaged with auxiliary clamping ring 44—also have a certain amount of preload in the radially outward direction, an external force that presses latch hooks 42 inward is required to disengage 15 clamping rings 42 from auxiliary clamping ring 44. Lubricating unit 10 is ultimately fixed in position on nut main body 54 in the axial direction by tightening lock nut 46 relative to nut main body 54.

In FIG. 3 it is shown that application section 34 extending inwardly in the radial direction away from the first storage region engages in rolling element running groove 58 formed in a spiral shape in the outer surface of spindle 52, so that its free end is in contact with the base of the rolling element running groove. The elasticity of application section 34 made of a foamed material ensures that, during operation of the ball screw drive, the free end of application section 34 is always in contact with the rolling body bearing surface and can provide it with lubricant.

Figure 2:
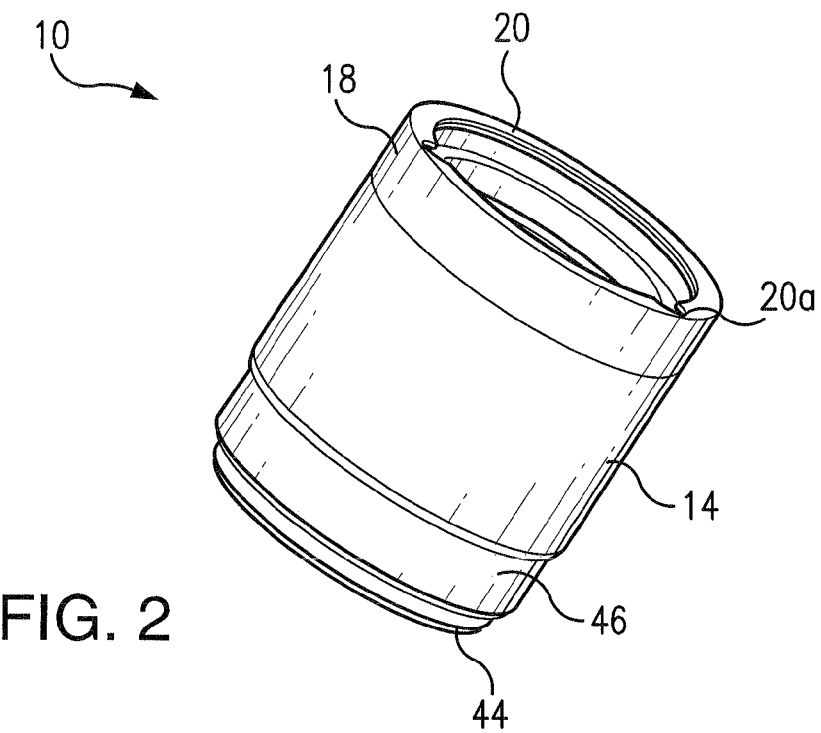
FIG. 2 shows the lubricating unit in FIG. 1, in the assembled state.
Figure 4:
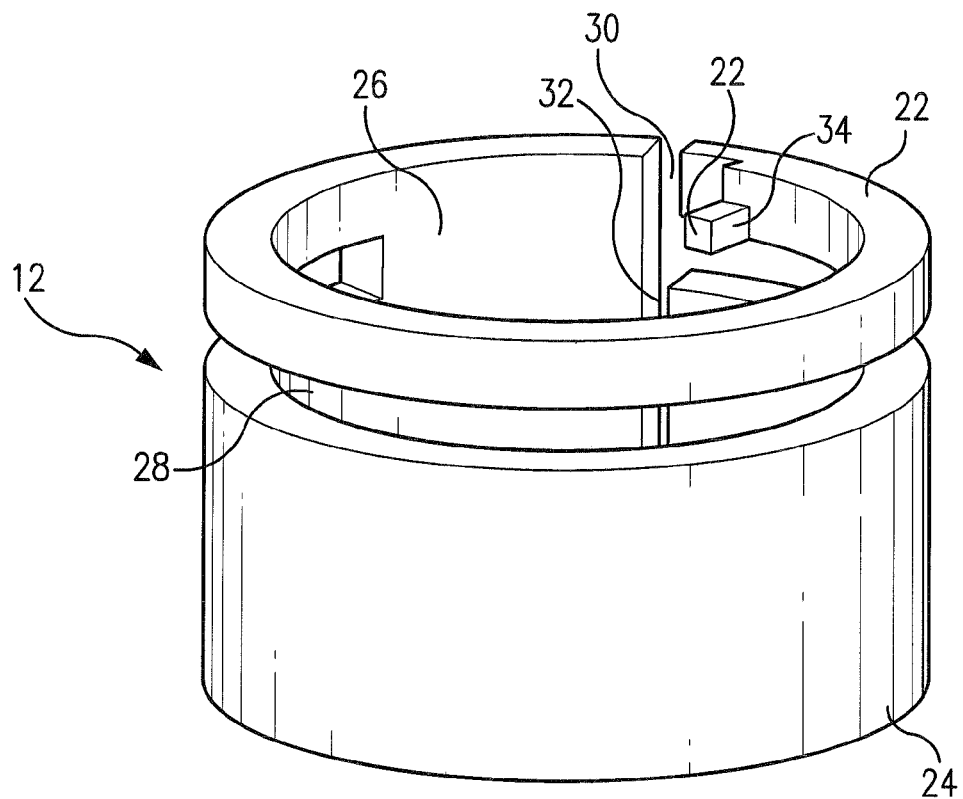
FIG. 4 shows the embodiment—depicted in FIG. 1—of an inventive lubricating element with an annularly bent, first storage region and an adjacent, annularly bent, second storage region, in a perspective view.

FIG. 4 shows lubricating element 12—which was shown in FIG. 2—separately, and in an enlarged view. In addition to the explanations provided with reference to FIG. 2, above, FIG. 4 clearly shows the single-piece design of lubricating element 12 with first storage region 22—which is shaped like a strand, designed as a cord or wick, and bent in an annular shape—abutting a second storage region 24—designed as a flat ring— in the axial direction of the annulus via a transition section 26. Neither first storage region 22 nor second storage region 24 are closed to form a complete ring. Instead, they each include a gap 30 and 32, which extends in the axial direction. Application section 34, which projects radially inwardly, abuts the end—that is diametrically opposed to transition section 26—of first storage region 22, which forms an annular strand. Application section 34 is formed by cutting out and bending a front side—located on the inner edge—of the material of which the first storage region is composed. Annular first storage region 22 has an essentially square cross section. When the lubricating element operates (i.e., when lubricant is supplied to the rolling element bearing surface via end face 35—which bears against the rolling element bearing surface—of application section 34), the lubricant flows through the first storage region essentially in the circumferential direction of the annulus, i.e., perpendicularly to its square cross-sectional area. Second storage region 24 is also annular in shape, although its cross section has the shape of an elongated rectangle.

Figure 5:
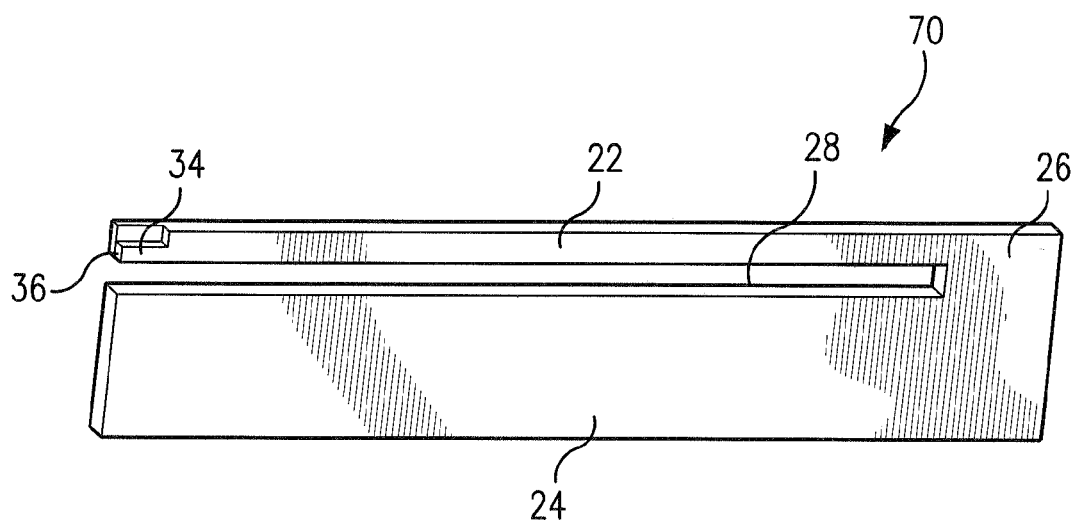
FIG. 5 shows a cut-out, foamed material panel, which is used to form the lubricating element shown in FIG. 4.

FIG. 5 shows a foamed material panel 70, which is used to form lubricating element 12 shown in FIG. 4. Foamed material panel 70 was originally cut out in a rectangular shape, with a longitudinal side and a narrow side, which is clearly shorter by comparison. Starting on a narrow side, an elongated indentation is formed parallel to the longitudinal side, which extends nearly to the diametrically opposed end face of the panel. This indentation forms recess 28 extending in the axial direction between the narrow strip forming first storage region 22 with a nearly rectangular cross section and the wider strip forming second storage region 24, the cross section of which has the shape of an elongated rectangle. On the end face of the narrow rectangular strip, which forms first storage region 22, the material is cut once inwardly parallel to the flat side of the rectangle, and it is cut a second time perpendicularly to the flat side of the rectangle; the latter incision extends through only half of the thickness of the material. These two cut surfaces form two regions with a nearly square cross section on the end face; one was cut off completely, and the other eventually forms application section 34.

An open-cell foamed material is used to manufacture lubricating element 12. To create the open-cell foamed material, a plastic is foamed and pressed to form panels with the desired pore size, e.g., approximately 200, kg/m$^3$. The foamed material inserts which form lubricating element 12 are cut from these panels using water-jet cutting. The inserts are saturated with a lubricant, e.g., a lubricating oil, then they are inserted in receiving space 16 of lubricating unit 10 shown in FIG. 1. Instead of a purely open-cell foamed material, a foamed material can be used, e.g., with which the open-cell foamed material is closed-cell in design on the top and bottom flat sides. This has the advantage that the lubricant cannot leak out of the closed-cell edge regions, thereby ensuring that the lubricant can essentially only flow parallel to the flat sides. Plastic foamed materials manufactured via foaming, gelation and subsequent vulcanization of the foam are top selections as the material for lubricating element 12. The thickness of the foamed material panels manufactured using this method can be between 1.0, and 15.0, mm. Ester-based polyurethane foams have proven to be suitable, for example. They are available under the trade names Inducon, Normont and Cellofoam, for instance.

Figure 6:
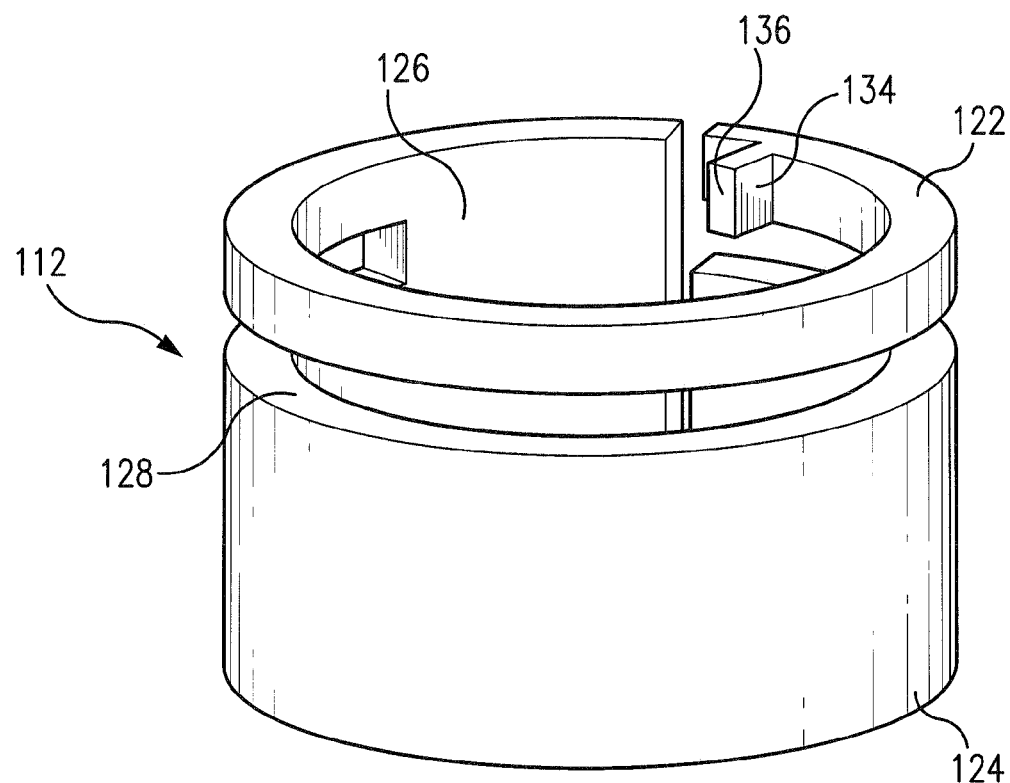
FIG. 6 shows a further embodiment of an inventive lubricating element that essentially corresponds to the embodiment shown in FIG. 4, with the exception that the application section has a larger cross-sectional area.
Figure 7:
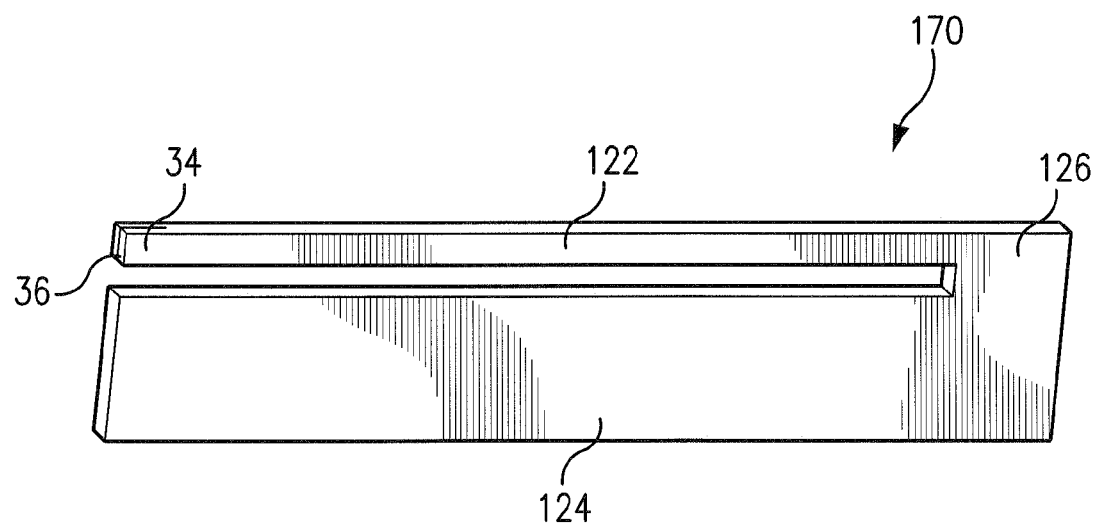
FIG. 7 shows a cut-out, foamed material panel, which is used to form the lubricating element shown in FIG. 6.

FIGS. 6 and 7 show views of a further embodiment of an inventive lubricating element 112, which correspond to the views in FIGS. 4 and 5. With the lubricating element shown in FIGS. 4 and 5, components that correspond to the components of lubricating element 12 depicted in the previous figures are labeled with the same reference numerals plus 100. To prevent unnecessary repetitions, only the differences in the embodiment shown in FIGS. 6 and 7 compared with the embodiment described above will be described in greater detail, and reference is made to the description of the previous figures for explanation of the remaining aspects.

In the embodiment shown in FIG. 6, application section 134 is formed merely by creating at least one slot or indentation extending essentially parallel to the flat side of foamed material panel 170. Then the radially inward subsection can be folded toward the inside. The cross-sectional area of application section 134 is therefore half as large as that of first storage region 122, in contrast to the embodiment shown in the previous figures, with which the application section has essentially one-fourth the cross-sectional area of the first storage region. The remaining design of lubricating element 122 shown in FIGS. 6 and 7 is identical to the lubricating element depicted in the previous figures.

Figure 8:
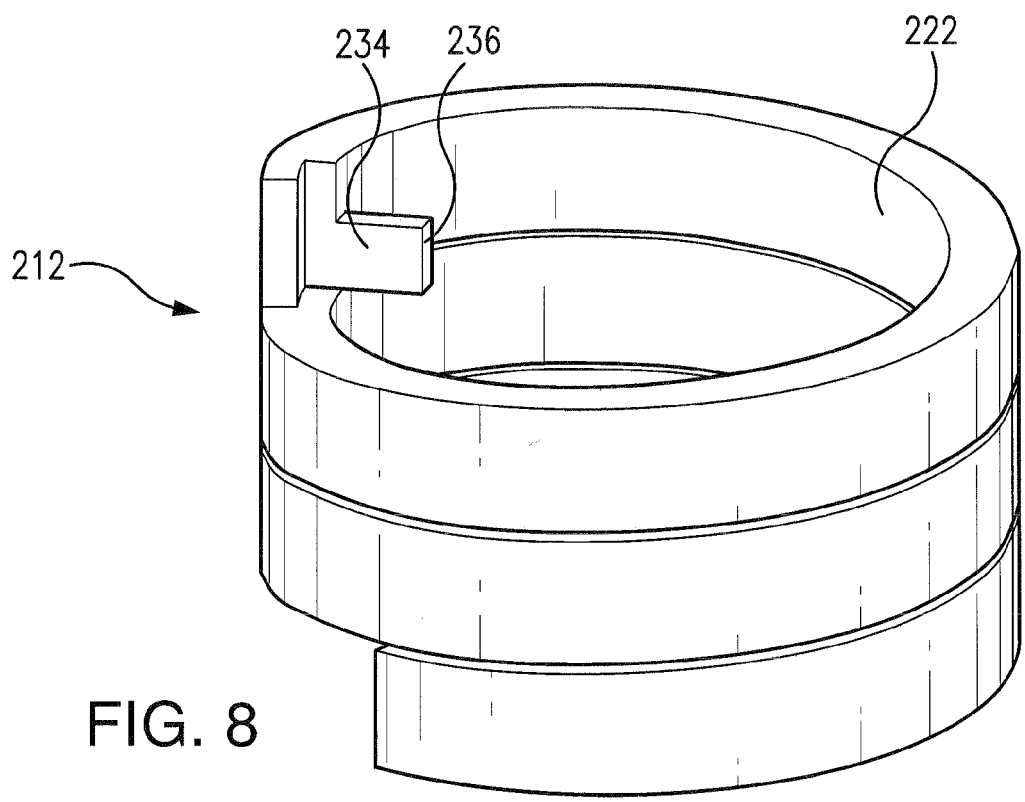
FIG. 8 shows a further embodiment of an inventive lubricating element, which has been wound in the shape of a spiral.

A further embodiment of an inventive lubricating element 212 in the form of a strand of foamed material—wound in the shape of a spiral—is shown in FIG. 8. With this embodiment as well, the components that are identical to or that have the same function as the components described with reference to the embodiments depicted in the previous figures are labeled with the same reference numerals plus 200 as compared with the embodiment shown in FIGS. 4 and 5. Identical aspects of the embodiment depicted in FIG. 8 will not be described, either. Instead, reference is made to the description of the previous embodiments.

Lubricating element 212 depicted in FIG. 8 includes only a first storage region 222 with an adjacent application section 234. It does not include a second storage region. Instead, first storage region 222 is formed out of a very long, strand-shaped piece of foamed material, which is wound in the shape of a spiral such that a lubricating element 212 with an overall essentially annular shape results, which can also be inserted in receiving space 16 of lubricating unit 10, similar to the storage elements described previously. The individual windings of the strand-shaped and spiral-wound first storage region 222 abut each other. To prevent lubricant from flowing transversely to the longitudinal direction of first storage region 222, i.e., transversely to the circumferential direction of lubricating element 212 via a "short circuit" of the lubricant flow between turns, lubricating element 212 can be made of a panel-shaped, open-cell plastic foam, in the case of which two diametrically opposed longitudinal side surfaces are closed-cell in design, thereby ensuring that lubricant cannot be transported through these lateral surfaces. Lubricating element 212 is then wound in first storage region 222 such that two of the closed-cell lateral surfaces abut each other.

Figure 9:
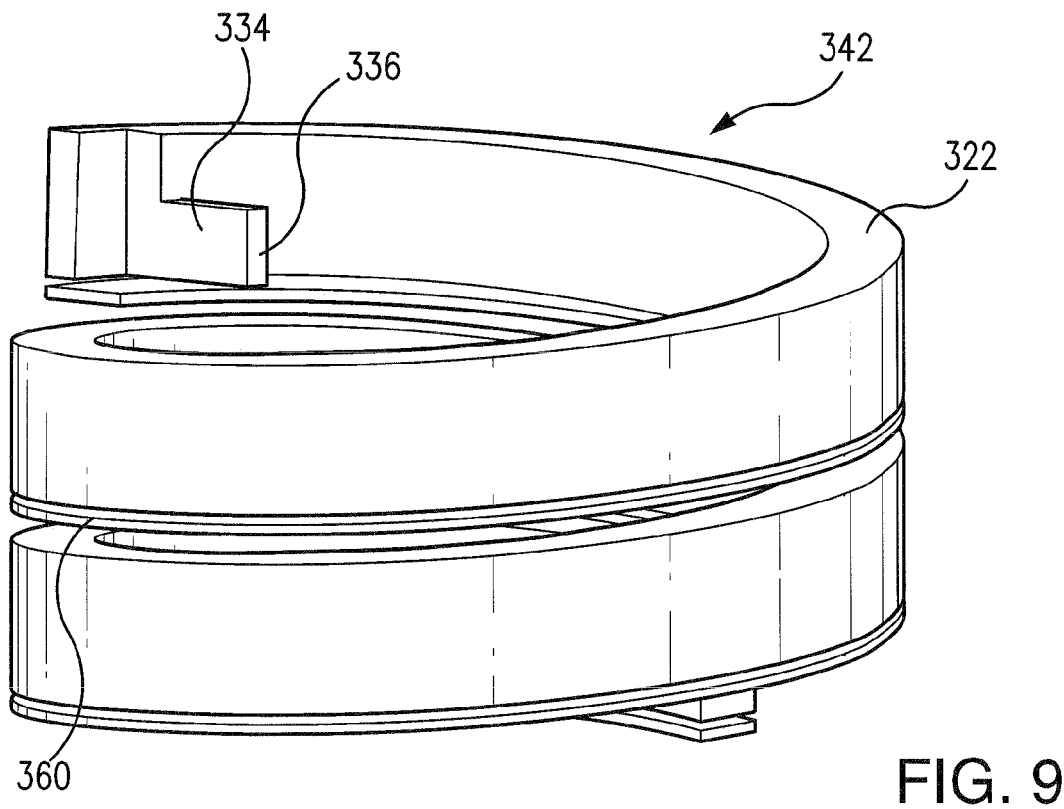
FIG. 9 shows a further embodiment of an inventive lubricating element, which is wound in the shape of a spiral, with a spiral-shaped, plastic element located between the individual spiral turns.

With lubricating element 312 shown in FIG. 9—which, similar to lubricating element 212 shown in FIG. 8, also includes only one spiral-wound and essentially strand-shaped first storage region 322 with an adjacent application section 334—a spiral-wound layer 360 composed of a panel-shaped, lubricant-impermeable material (e.g., plastic) is located between the individual spiral turns of first storage region 322, in order to prevent a "short circuit" between the turns. Due to intermediate layer 360, the individual spiral turns of first storage region 322 have clearance between each other, and they are insulated from each other in terms of transport of lubricant transversely to the circumferential direction of the spiral turns.

With regard for the remaining aspects, the embodiment shown in FIG. 9 corresponds to the embodiment depicted in FIG. 8. Further aspects will therefore not be described and, instead, reference is made to the description of the embodiment shown in FIG. 8 and the embodiments depicted in the previous figures. It should be pointed out that components in FIG. 9 that are identical to components described with reference to the previous embodiments are provided with the same reference numerals plus 300 as compared with the embodiment depicted in FIGS. 4 and 5.

It should be pointed out that, in the embodiments with a spiral-wound first storage region, a short circuit between turns can also be prevented by inserting the strand-shaped first storage region in a tube composed of plastic foil, then winding the foamed material-tube combination in the shape of a spiral, or by wrapping the strand-shaped first storage region with a strip of plastic foil and then winding the foamed material-strip combination in the shape of a spiral.

In all of the embodiments, the spiral-wound lubricating element can be adapted to the size of receiving space 16 in main body 14 of lubricating unit 10 by selectively choosing the width of the strand-shaped first storage region and the number of turns. The desired maximum and minimum rate of lubricant supply can also be influenced in this manner. The cross section of the application section is generally always chosen such that it results in the best possible contact with the track surface.

Figure 10:
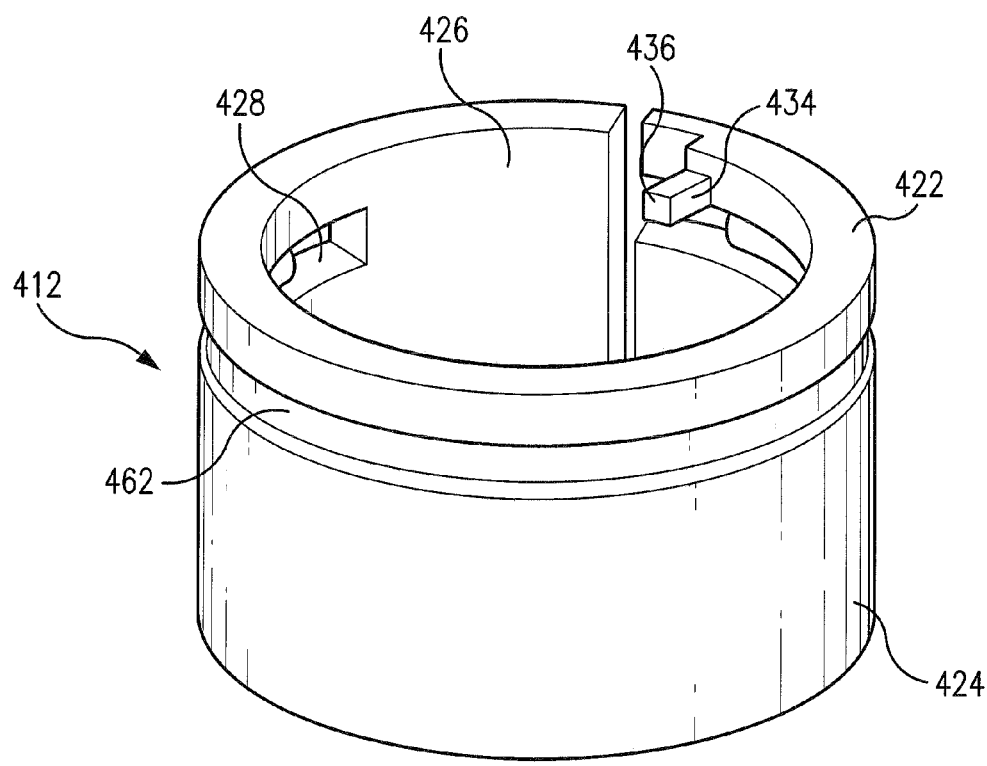
FIG. 10 shows a further embodiment of an inventive lubricating element that essentially corresponds to the embodiment shown in FIGS. 4 through 7, with the exception that a plastic ring is located between the circular ring turns of the first and second storage region, in order to separate the two.

Finally, FIG. 10 shows a further variant of an inventive lubricating element 412, which is very similar to lubricating element 12 depicted in FIGS. 4 and 5. Components that are identical to components described previously with reference to the embodiment depicted in FIGS. 4 and 5 are labeled with the same reference numerals plus 400. In the cases in which the function of these components is identical, they will not be described, and reference is made instead to the description of FIGS. 4 and 6.

With lubricating element 412 shown in FIG. 10, a plastic ring 462 open on one side is inserted in gap 428, which is formed axially between the narrow, annular first storage region 422 with a nearly square cross section and the wide, annular second storage region 424. Plastic ring 462 maintains clearance between first storage region 422 and second storage region 424, thereby preventing the first storage region from coming in contact with the second storage region anywhere except for connection section 426. In this manner as well, lubricant from second storage region 424 is also prevented from being transported into first storage region 422 while avoiding connection section 426. In this manner, it is ensured that the lubricant must always flow through first storage region 422 along its entire longitudinal extension, i.e., in the circumferential direction of the ring, before it reaches application section 434.

For all of the embodiments shown, suitable lubricants have been found to be lubricating oils with a viscosity between 70, and 90, mm$^2$/sec. at 100° C., and 900, to 1000, mm$^2$/sec. at 40° C., e.g., the lubricating oil sold under the trade name Mobil SHC600, series 639, which has a viscosity of 79.5, mm$^2$/sec. at 100° C., and 933, mm$^2$/sec. at 40° C.

It will be understood that each of the elements described above, or two or more together, may also find a useful application in other types of constructions differing from the type described above.

While the invention has been illustrated and described as embodied in a lubricating element and lubricating unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A lubricating element for rolling element tracks, comprising a body composed of a lubricant-storing material, said body including an application section bringable into contact with a rolling element bearing surface to supply lubricant, said body having an elongated shape in a first storage region adjacent to said application section, said first storage region and said application section being configured so that a lubricant flow through said first storage region triggered via a dispensing of lubricant at said application section is essentially oriented in a longitudinal direction of said first storage region, wherein said body is composed of a foamed material and formed as a rectangular panel with a first and a second end face, wherein the panel is bent into a cylindrical shape such that the first and second end faces confront each other, wherein the panel has one and only one annular gap which extends circumferentially between the first storage region and a second storage region of the panel, wherein the body has a single transition section extending between the first and second storage regions, wherein the annular gap extends from the first end face to the transition section such that lubricant can flow from the second storage region to the first storage region via the transition region.

2. A lubricating element as defined in claim 1, wherein said application section is located in an end-face end region of said first storage region.

3. A lubricating element as defined in claim 1, wherein the foamed material of said body is an open-cell foamed material.

4. A lubricating element as defined in claim 1, wherein said application section is formed as a single piece with said first storage region.

5. A lubricating element as defined in claim 1, wherein said body includes at least one indentation provided in said first storage region for forming said application section.

6. A lubricating element as defined in claim 1, wherein said body includes at least one indentation in said first storage region, said application section being provided in an application section region at a location selected from the group consisting of between said indentations and between said indentation and lateral surfaces of said body.

7. A lubricating element as defined in claim 6, wherein said application section region provided to form said application section is foldable over so as to form a right angle with an adjacent surface of said body.

8. A lubricating element as defined in claim 1, wherein said application section has a cross-section which is smaller than a cross-section of said body in said first storage region.

9. A lubricating element as defined in claim 1, wherein said body has a rectangular cross-section in said first storage region.

10. A lubricating element as defined in claim 1, further comprising a jacket enclosing said body in said first storage region and composed substantially of a lubricant-impermeable material, said body together with said jacket being wound in a shape of an element selected from the group consisting of a spiral and a ring.

11. A lubricating element as defined in claim 1, further comprising a strip which wraps said body in said first storage region and is composed substantially of a lubricant-impermeable material, said body with said strip being wound in a shape of an element selected from the group consisting of a spiral and a ring.

12. A lubricating element as defined in claim 1, wherein said body is formed as an element which is cut off of a panel of open-cell foamed material, wherein a top and an underside of said panel has a closed-cell design, while said body in said first storage region is wound such that closed-cell lateral surfaces touch each other.

13. A lubricating element as defined in claim 1, wherein said second storage region is adjacent to said first storage region that is elongated.

14. A lubricating element as defined in claim 13, wherein said second storage region of said body is configured as an annular storage region.

15. A lubricating element as defined in claim 1, wherein the lubricating element is configured for rolling element tracks in linear motion systems.

16. A lubricating unit for tracks of rolling bodies of a linear system, with an element selected from the group consisting of a nut element and a carriage element guided along a linear guide element by the rolling bodies, the lubricating unit including a lubricating element for rolling element tracks, comprising a body composed of a lubricant-storing material, said body including an application section bringable into contact with a rolling element bearing surface to supply lubricant, said body having an elongated shape in a first storage region adjacent to said application section, said first storage region and said application section being configured so that a lubricant flow through said first storage region triggered via a dispensing of lubricant at said application section is essentially oriented in a longitudinal direction of said first storage region, wherein said body is composed of a foamed material and formed as a rectangular panel with a first and a second end face, wherein the panel is bent into a cylindrical shape such that the first and second end faces confront each other, wherein the panel has one and only one annular gap which extends circumferentially between the first storage region and a second storage region of the panel, wherein the body has a single transition section extending between the first and second storage regions, wherein the annular gap extends from the first end face to the transition section such that lubricant can flow from the second storage region to the first storage region via the transition region.

17. A lubricating unit as defined in claim 16, wherein said lubricating unit is installed on an axial end of said element selected from the group consisting of the nut element and the carriage element.

18. A lubricating unit as defined in claim 17, further comprising a cylindrical lubricating element housing in which an annular receiving space for said lubricating element is formed, said lubricating element housing having an inner wall which encloses said linear guide element.

19. A lubricating unit as defined in claim 18, wherein said inner wall of said lubricating element housing encloses said linear guide element which is formed in an element selected from the group consisting of a spindle of a rolling element screw drive and a cylinder guide of a ring bushing.

20. A lubricating unit as defined in claim 18, wherein said inner wall of said lubricating element housing has an opening through which said application section of said lubricating element is guided in order to contact a bearing surface of said rolling element.

21. A lubricating element as defined in claim 20, wherein said inner wall of said lubricating element has an application nose in which said opening for said application section is formed.

22. A lubricating element as defined in claim 20, further comprising an application nose in which said opening of said application section is formed, said application nose being inserted in said inner wall of said lubricating element housing.

23. A lubricating element as defined in claim 20, further comprising a cover which closes said receiving space for said lubricating element and said lubricating element housing.

24. A lubricating element as defined in claim 16, wherein the lubricating unit is configured for tracks of rolling bodies of a linear system selected from the group consisting of a rolling element screw drive, a profiled rail guide, and a ring bushing.

* * * * *